United States Patent [19]

Gardner

[11] Patent Number: 4,787,281

[45] Date of Patent: Nov. 29, 1988

[54] METHOD OF DIVIDING LOGS OF HEATED METAL INTO BILLETS AND APPARATUS FOR USE IN THE METHOD

[75] Inventor: John A. Gardner, Tettenhall, Great Britain

[73] Assignee: Mechatherm Engineering Limited, West Midlands, United Kingdom

[21] Appl. No.: 21,760

[22] Filed: Mar. 4, 1987

[30] Foreign Application Priority Data

Mar. 8, 1986 [GB] United Kingdom ................. 8605773

[51] Int. Cl.[4] ............................................. B23D 33/02
[52] U.S. Cl. ......................................... 83/15; 72/254; 83/42; 83/71; 83/170; 83/278; 83/367
[58] Field of Search ...................... 83/15, 42, 71, 278, 83/367, 170; 72/254, 255

[56] References Cited

U.S. PATENT DOCUMENTS

| 4,526,073 | 7/1985 | Elhaus | 83/15 |
| 4,559,854 | 12/1985 | Jürgens | 83/15 X |
| 4,651,602 | 3/1987 | Harrold et al. | 83/71 X |
| 4,677,838 | 7/1987 | Bessey et al. | 83/170 X |

*Primary Examiner*—Frank T. Yost
*Attorney, Agent, or Firm*—Klarquist, Sparkman, Campbell, Leigh & Whinston

[57] ABSTRACT

A method and apparatus for dividing metal logs into billets is disclosed. The apparatus includes a furnace, a shear spaced from the furnace, and a guide-pusher system for moving the logs relative to the furnace and shear. Using this apparatus, a first log is cut into a plurality of billets each having a predetermined length. As a result, the remaining end of the first log will be unacceptably short. Instead of discarding this portion, it is selectively divided to form the first part of a combination, two-part billet. The second part of the two-part billet is severed from the end of a second log to be processed in the apparatus. As a result, a two-part billet is produced from materials which would normally be discarded, thereby resulting in considerable cost savings.

8 Claims, 7 Drawing Sheets

METHOD OF DIVIDING LOGS OF HEATED METAL INTO BILLETS AND APPARATUS FOR USE IN THE METHOD

BACKGROUND TO THE INVENTION

The present invention relates to the heating and dividing into billets of logs of metal. Aluminium and alloys of aluminium are commonly cast into cylindrical bodies having a length of several meters and a diameter in the region of 150 to 200 mm. These bodies are called logs. Extrusion is commonly used to form aluminium and its alloys to useful shapes. A complete log cannot be accommodated in an extrusion press and it is therefore necessary to divide a log into several billets having respective lengths such that the billets can be charged, one at a time, into the breach of an extrusion press. The preferred length of a billet is dependant on the mass of the required extrusion. Some wastage of metal is unavoidable when converting a billet to a usable extrusion but it is desirable to minimise the mass of metal wasted, because of the energy needed to recycle wasted metal. It is therefore desirable for the logs to be divided into billets, the length of each billet being determined in accordance with the mass of the extrusion required to be produced from the billet.

SUMMARY OF THE INVENTION

Cutting successive billets from a log can leave a relatively short trailing end portion of the log. If this trailing end portion has a length less than the diameter of the log, then it cannot conveniently be handled by the equipment and would have to be discarded. It is an object of the present invention to avoid the production of an end portion of a log which is so short that it must be discarded.

According to a first aspect of the invention, there is provided a method of dividing logs of heated metal into billets wherein each of a pair of billets formed from adjacent end portions of two logs is a two-part billet comprising one part formed from a first of the logs and the other part formed from a second of the logs.

In a method in accordance with the present invention, the dividing from a remainder of a log of a billet having a length such that the remaining end portion of the log will then be unacceptably short is avoided by dividing the remainder of the first log to form a part only of one billet and a remaining portion of the log of convenient length, removing that remaining portion out of the path of travel of the log through a shear, dividing the required second part of the one billet from the leading end of the second log, subsequently returning the remainder of the first log to the path and using that remainder as one part of a further billet, the other part of which is divided from the second log. Provided no billet has a length less than twice the diameter of the logs, each billet part can have a length at least equal to the diameter of the log and this makes it possible for the automatic handling equipment to control the position of each billet part adequately.

The length of each log is preferably measured when that log is introduced into a path leading through a furnace to the shear. When the log reaches the shear, the length of each billet or part billet produced from that log is subtracted from the length of the log to give a value for the length of the remainder of the log. From the length of this remainder and the required length of the next billet, a prediction can be made as to whether the length of the remainder of the log after shearing the next billet will be inconveniently small.

According to a second aspect of the invention, there is provided apparatus for heating and shearing into billets metal logs, the apparatus comprising a furnace, a shear spaced from the furnace, guide means defining a rectilinear path through the furnace and through the shear, respective pushers at opposite ends of said path for pushing logs along said path in either selected direction and holding means for moving transversely from a position on said path between the furnace and the shear a trailing end portion of a log, holding that trailing end portion out of the path and then returning the trailing end portion to the path between the furnace and the shear.

The preferred apparatus further comprises control means for controlling operation of the shear, of the pushers and of the holding means, signalling means for providing to the control means a signal representing movement of the pusher which is at the upstream end of said path and sensing means for sensing the presence of a log at a predetermined position along the path.

In a case where a part only of one billet is divided from a trailing end portion of a first log, the remainder of that first log is moved by the holding means out of the path of travel of the logs to the shear and a further part of the one billet is divided from a second log. The remainder of the first log may be returned to the path and then pushed back into the furnace if cooling of that remainder before extrusion would otherwise be excessive.

BRIEF DESCRIPTION OF THE DRAWINGS

An example of apparatus embodying the second aspect of the invention and use of that apparatus in a method according to the first aspect of the invention will now be described, with reference to the accompanying drawings, wherein.

DESCRIPTION OF THE PREFERRED EMBODIMENT

The apparatus illustrated in the accompanying drawings comprises an elongated furnace 10, a shear 11 spaced from the furnace and guide means, part of which is represented at 40 for guiding logs of metal along a rectilinear path into the furnace, through the furnace and from the furnace to the shear. One or more of the furnace, the shear and the guide means may be constructed and arranged in a known manner.

Figure 1:
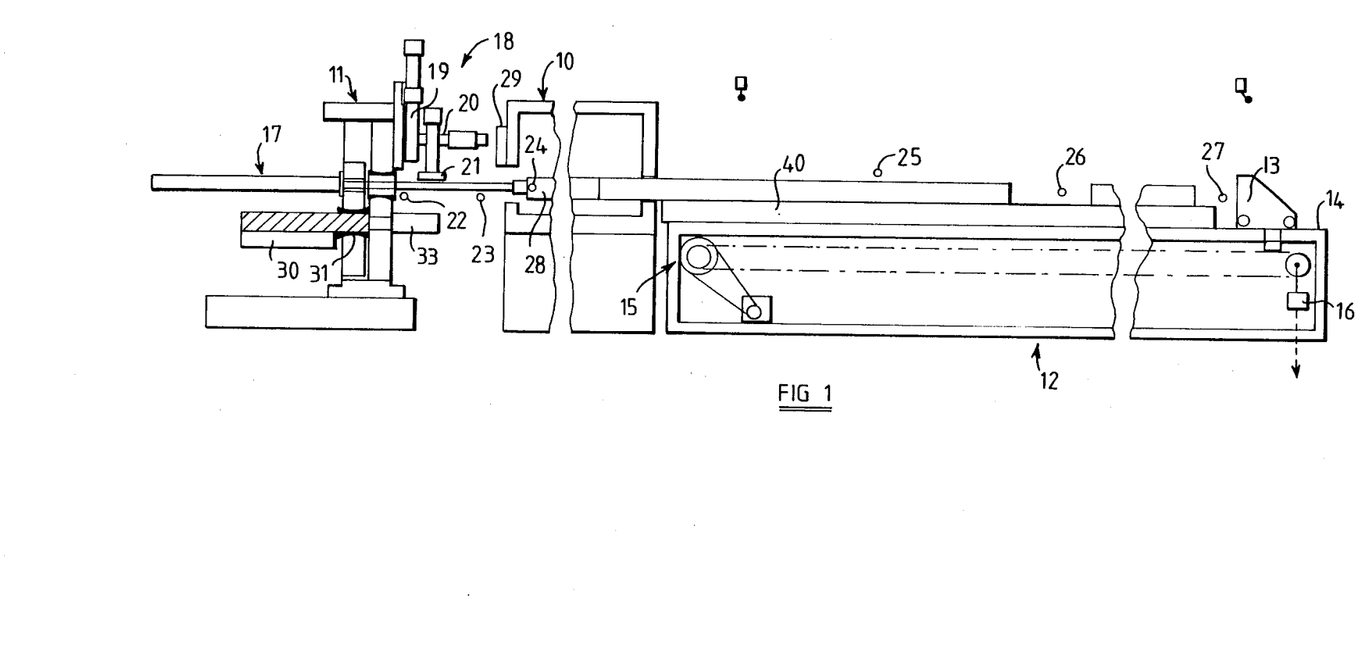
FIG. 1 is a diagrammatic representation of apparatus for heating and dividing into billets logs of metal.

A part of the path defined by the guide means lies upstream of the furnace. Also disposed upstream of the furnace is an assembly 12 which includes a pusher 13 shown in FIG. 1 at an upstream end of the path defined by the guide means. The pusher assembly 12 includes a track 14 for supporting the pusher 13 for reciprocation towards and away from the furnace along the path defined by the guide means, drive means 15 for moving the pusher positively in either selected direction along the path and signalling means 16 for providing an electrical signal representing movement of the pusher. The drive means for the pusher may be arranged in a known manner and is conveniently energised hydraulically. The signalling means 16 may be a known rotary encoder operatively associated with a sprocket or other rotatable element around which there extends an endless chain or other driving element of the drive means 15.

At the downstream end of the path defined by the guide means, there is provided a further hydraulically actuated pusher 17 which can reciprocate along the path defined by the guide means between the shear and the furnace.

The apparatus further comprises holding means 18 adapted for moving transversely from a position on the path defined by the guide means a portion of a log, holding that portion out of the path and then returning that portion to the path between the shear and the furnace. The holding means lies generally in the region between the shear and the furnace and is conveniently mounted on a fixed part of the shear.

The holding means 18 comprises a carriage 19 which can be raised and lowered hydraulically, a slide 20 mounted on bars projecting horizontally from the carriage so that the slide can be reciprocated relative to the carriage along a horizontal path parallel to the path defined by the guide means and also participates in upward and downward movement of the carriage. Piston and cylinder units are provided for reciprocating the slide 20 relative to the carriage. On the slide, there are mounted two pivoted arms carrying at their lowers ends respective jaws 21. A further piston and cylinder unit is operatively associated with the arms at their upper ends to move the jaws 21 towards and away from each other. When the carriage 19 is in its lowermost position, the jaws 21 lie at opposite sides of the path defined by the guide means. The stroke of the carriage is such that, when the carriage is moved to its uppermost position, any portion of a billet carried by the jaws 21 is moved completely out of the path defined by the guide means along which logs travel from the furnace to the shear.

Control means is provided for controlling operation of the pushers 13 and 17, of the shear 11, of the holding means 18 and of a door of the furnace, if the furnace is provided with a door 29 at the end thereof adjacent to the shear. The signalling means 16 is associated with the control means to provide thereto a signal representing movement of the pusher 13. Further sensing devices 22 to 27 are disposed at fixed positions along the path defined by the guide means to provide to the control means electrical signals indicative at the presence or absence of a log at respective positions along the feed path. The control means includes a microprocessor and input means for receiving and applying to the micrprocessor information concerning the required lengths of billets to be produced.

It will be understood that the apparatus illustrated in the accompanying drawings is intended for use in conjunction with a press and that billets are ejected from the shear onto a cradle 30 from which the billets are transferred to the press. Whilst a billet is on the cradle, the cradle may be turned through an angle of 180° about a vertical axis to reverse the billet.

A log which is to be charged into the furnace 10 is transferred into the path defined by the guide means at a position upstream of the furnace and lying between the sensing devices 26 and 27. During this operation, the pusher 13 occupies the position shown in FIG. 1. The pusher is then advanced towards the furnace. When the pusher passes the sensing device 27, a signal is provided to the control means. After the pusher has passed the sensing device 27, it engages the trailing end of the log and advances the log along the path. A further signal is provided when the leading end of the log passes the sensing device 26. The signal received by the control means from the signalling means 16 from the moment when the signal is received from the sensing device 27 to the moment when the signal is received from the sensing device 26 is used to compute the length of the log. This value is entered in a memory of the control means.

Figure 2:
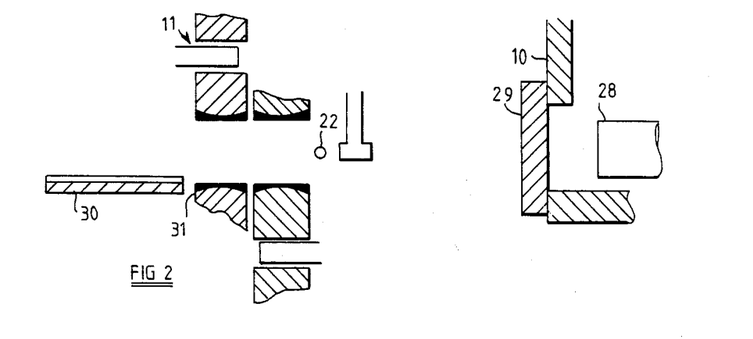
FIGS. 2 to 7 illustrate diagrammatically successive stages in operation of the apparatus to sever a one-piece billet from a leading end portion of a log.

The relative positions of a first log 28, the furnace 10 and the shear 11 at the beginning of a cycle are illustrated in FIG. 2. In the ensuing description, we mean by a cycle a sequence of operations which results in the production of a single billet, irrespective of whether that billet is a one-piece billet or is a two-part billet. Prior to commencement of the cycle, the shear rings of the shear 11 are aligned with the path defined by the guide means, the jaws 21 are in an open position in which they lie at opposite sides of the path defined by the guide means but can receive between them a log with clearance and the leading end of the log 28 is disposed inside the furnace 10.

When the cycle begins, the door 29 is opened and the pusher 13 is advanced to move the leading end of the log 28 out of the furnace and through the shear so that a leading end portion of the log which is to form the required billet occupies the cradle 30 and the shear ring 31 adjacent to the cradle. The distance through which the pusher 13 travels is controlled by the control means in accordance with the required length of the billet to be produced and the control means decelerates the pusher as it approaches the end of the required travel, so that the log 28 does not overshoot the required position. It will be noted that there is no end stop at the downstream side of the shear to arrest the log at a required position. As the leading end of the log 28 passes the sensing device 22, a signal is provided to the control means and the control means then uses the signal from the signalling means 16 as an indication of the position of the leading end of the log relative to the sensing device 22. As the sensing device is fixed a predetermined distance from the shear line, the control means is able to compute the travel of the pusher 13 which is required after the signal has been received from the sensing device 22 to produce a billet of a selected length.

Figure 3:
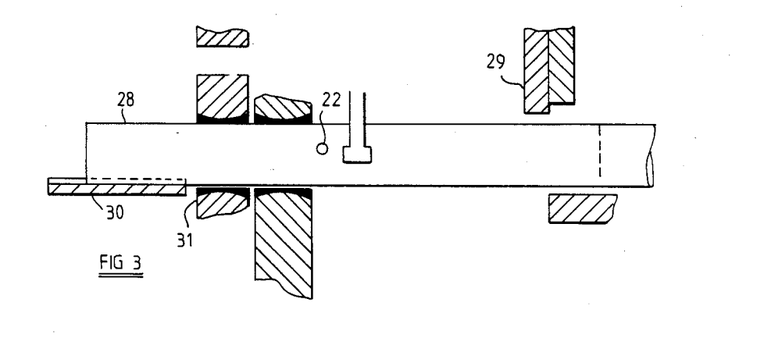
Figure 4:
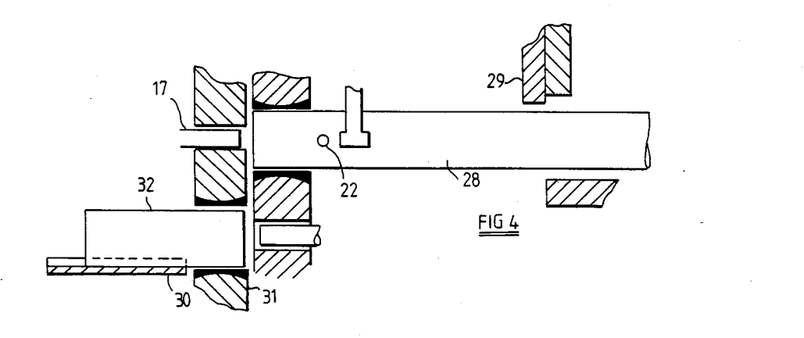
Figure 5:
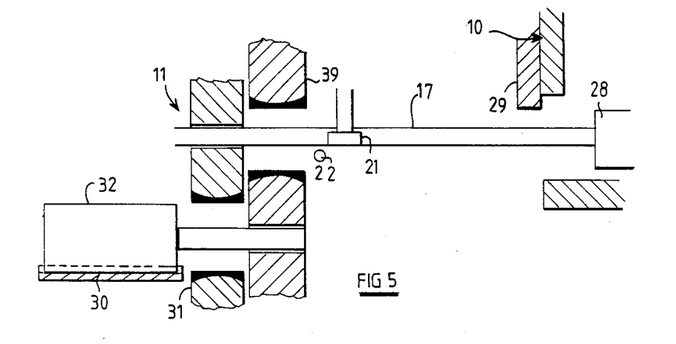
Figure 6:
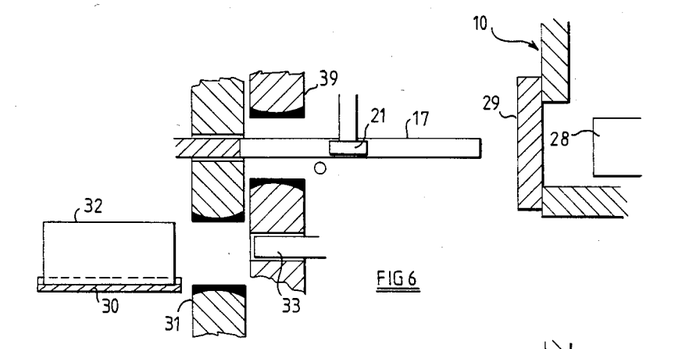
Figure 7:
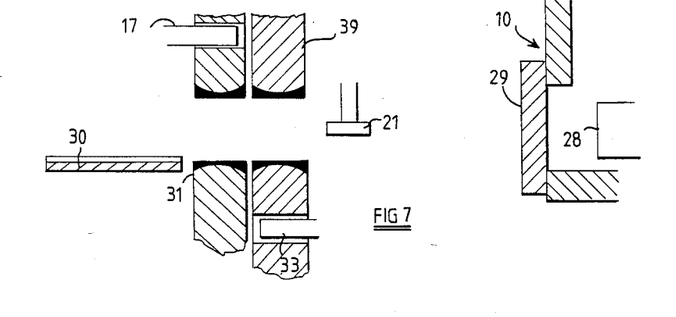
Figures 8, 9:
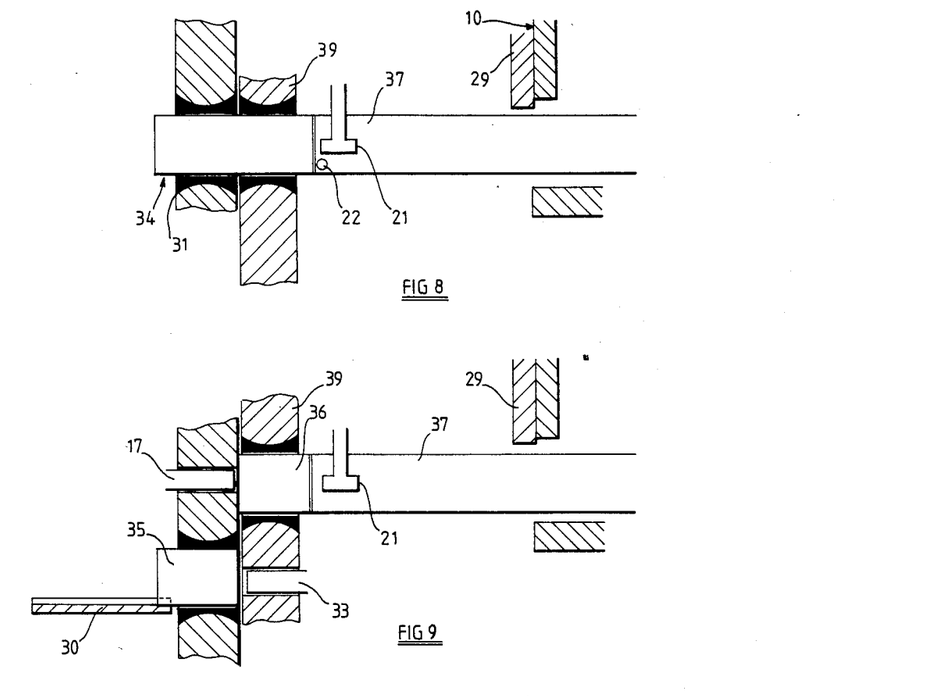
FIGS. 8 to 17 represent diagrammatically successive stages of operation of the apparatus to form a two-piece billet from a trailing end portion of a first log and a leading end portion of a second log.

FIG. 3 illustrates the position of the log 28 when the log has come to rest. The shear then operates as illustrated in FIG. 4 to produce the billet 32. The billet is then pushed from the shear ring 31 onto the cradle 30 and is transferred to the press. Meanwhile, the remaining part of the log 28 is pushed back into the furnace 10 by the pusher 17. The pusher 17 is then retracted from the furnace, as shown in FIG. 6, and the door 29 is closed. Meanwhile, the ejector 33 retracts from the billet 32 and from the shear ring 31, so that the later can be returned to the position illustrated in FIGS. 2 and 3. The pusher 17 moves up and down with the cradle and the shear ring 31.

The holding means 18 is not operated during the sequence of steps illustrated in FIGS. 2 to 7.

If, during a subsequent cycle, the pusher 13 passes the sensing device 25, once the leading log has been moved through the shear to the required position, the pusher 13 will retract fully and a fresh log will moved into the path defined by the guide means, ready to be advanced into the furnace 10.

Prior to dividing of each billet from a log, the control means compares the required length of the billet with the length of the remainder of the log and computes the length of that part of the log which will remain after the new billet has been divided from the log. If either the length of the required billet exceeds the length of the remaining part of the log by a difference which is no more than a predetermined value, the diameter of the log, or the length of the remaining part of the log exceeds the length of the required billet by no more than that predetermined value, then the microprocessor takes a decision to produce a pair of two-part billets by a sequence of steps, some of which are illustrated in FIGS. 8 to 17.

Figure 10:
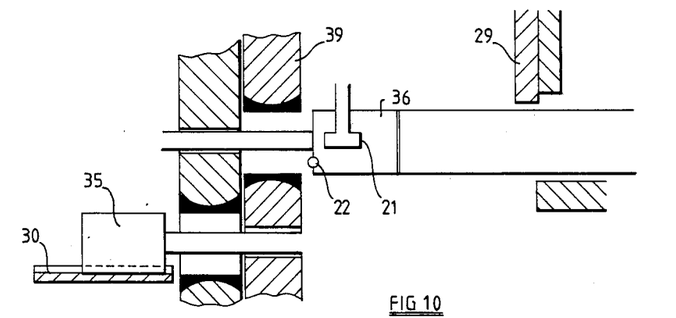
Figure 11:
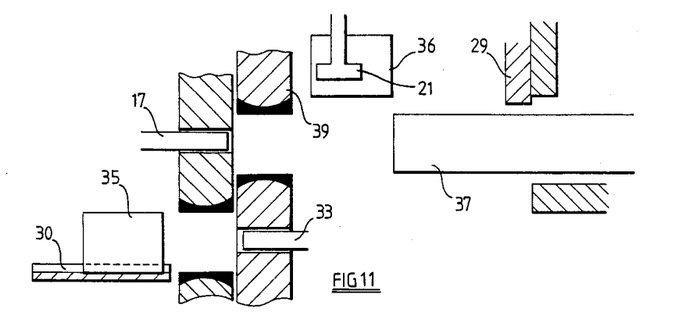

At the beginning of a cycle which will produce a two-part billet, the apparatus is in the condition illustrated in FIG. 2, the remaining part of the first log being disposed inside the furnace 10. The furnace door is opened and the logs are advanced along the path so that the remaining part 34 of the first log moves into the shear 11 and comes to rest at the position illustrated in FIG. 8, with the shear line being at least approximately mid-way between opposite ends of the log part 34. The shear is then operated to divide one part 35 of the required billet from a trailing end portion 36 of the first log. As shown in FIG. 10, the billet part 35 is then ejected from the shear ring onto the cradle and the trailing end portion 36 is pushed from the shear into a position between the jaws 21. The holding means 18 is then operated to clamp the trailing end portion 36 between the jaws 21 and to raise the carriage 19, the jaws 21 and the end portion 36 until the end portion is clear of the path along which the logs travel from the furnace 10 to the shear 11. The holding means then holds the trailing end portion 36 in this position, as illustrated in FIG. 11. It will be noted that, when the holding means 18 is operated to move the trailing end portion 36 from the path, the leading end of the second log 37 lies upstream of the sensing device 22.

Figure 12:
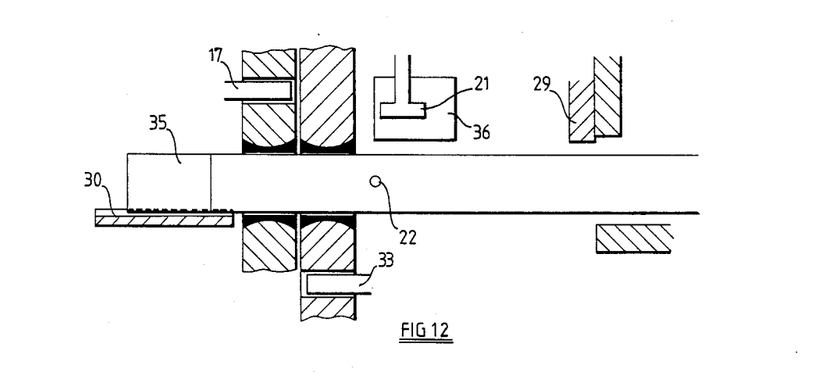
Figure 13:
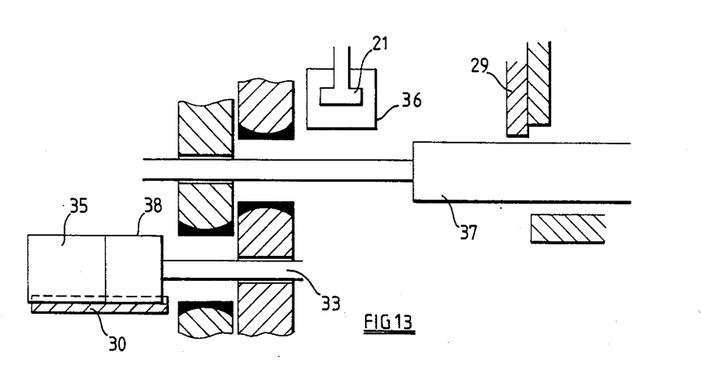
Figure 14:
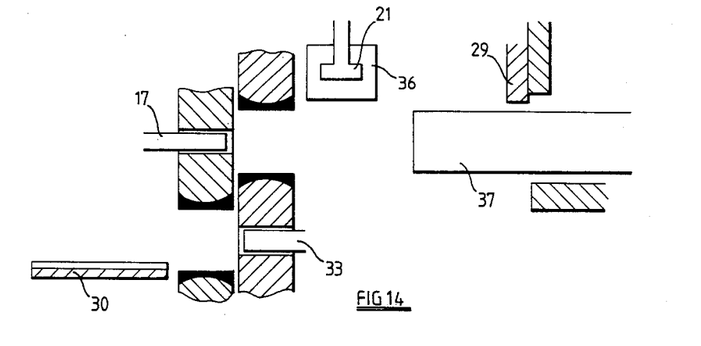
Figure 15:
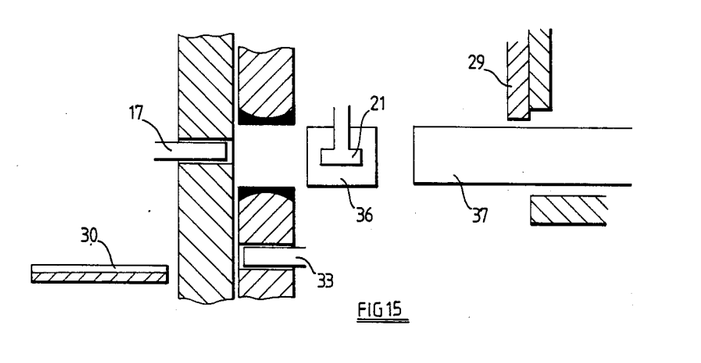

From the position illustrated in FIG. 11, the pusher 13 is advanced to move the leading end portion of the second log 37 through the shear to the position illustrated in FIG. 12. The shear is then operated to sever from the second log the required second part of the billet. This second part is then ejected from the shear ring 31 to join the part 35 of the billet on the cradle and the two-part billet is transferred to the press. Meanwhile, the remainder of the second log 37 is pushed back towards or into the furnace by the pusher 17.

Figure 16:
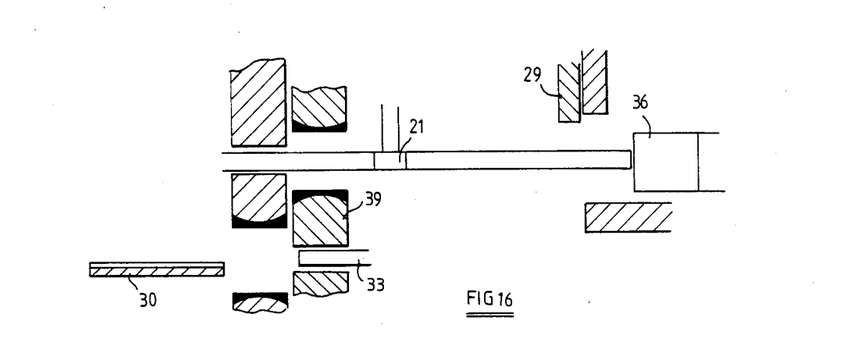

The pusher 17 may withdraw from the second log 37 once that second log has been moved beyond the trailing end portion 36 of the first log which is still held by the holding means but before the second log is returned completely into the furnace. Once the pusher 17 has been withdrawn from the space directly below the trailing end portion 36, the holding means 18 is operated once more to lower that trailing end portion into the path along which the logs are advanced to the shear 11. The jaws 21 are then moved slightly apart to release the trailing end portion 36 and the pusher 17 is used to push the trailing end portion and the remainder of the second log 37 into the furnace, as illustrated in FIG. 16. The cycle is completed by return of the pusher 17 to the position illustrated in FIG. 2 and closing of the furnace door.

Figure 17:
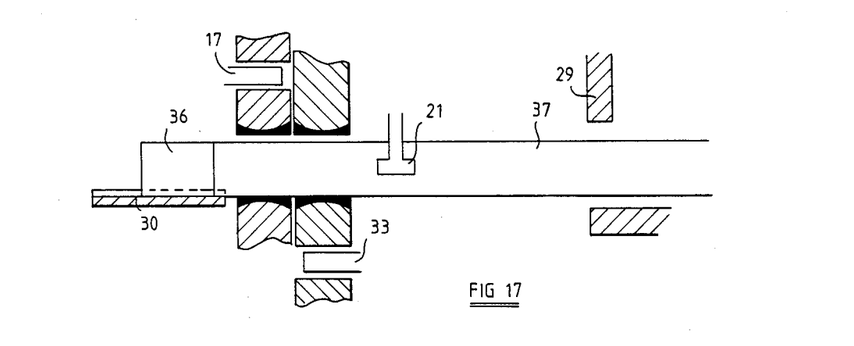

During the next cycle, the pusher 13 is advanced to move the trailing end portion 36 of the first log through the shear 11 and to move the second log 37 into the shear, as shown in FIG. 17, so that operation of the shear will produce a two-part billet of the required length, one of these parts being the end portion 36 and the other part being derived from the second log 37. The sequence of steps required to produce this billet is the same as the sequence which produces a one-piece billet.

On each occasion when a fresh log is introduced to the path defined by the guide means, the value held by the control means as representing the length of the remainder of that log which is nearest to the shear is substituted by the actual length remaining and is therefore corrected for any discrepancy. The actual length remaining is computed by subtracting from the distance between the shear line and sensing device 25 the sum of the lengths of any complete logs between the pusher 13 and the remaining part log and the distance which the pusher 13 has advanced beyond the sensing device 25 to position the fore-most log for shearing.

The cycle illustrated in FIGS. 8 to 17 may be modified by returning the second log 37 to the furnace 10 without the trailing end portion 36 of the first log. This trailing end portion would then be returned to the path defined by the guide means just prior to advancement of the second log 37 to the shear during the next cycle.

The apparatus illustrated in the accompanying drawings may be used for heating and transferring to a press billets which have been formed by cutting cold logs or otherwise. The billets are introduced into the path defined by the guide means and are advanced through the furnace 10 by the pusher 17. The column of heated billets is advanced to move the leading billet into and partly through the shear 11, so that the interface between the first and second billets comes to rest just on the upstream side of the shear line. The second billet will protrude from the shear towards the furnace. This second billet is gripped by the jaws 21 which are then moved a short distance away from the furnace by operation of the piston and cylinder units acting between the carriage 19 and the slide 20. The movement is sufficient to bring the trailing end of the first billet to the downstream side of the shear line. The movement of the jaws is then reversed to move the second billet towards the furnace until it lies entirely upstream of the shear line. The shear can then be operated without cutting any billet but carrying the leading billet downwardly, into alignment with the ejector 33. The leading billet is then ejected from the shear ring 31 and transferred to the press in the usual way. Meanwhile, a column of billets is pushed back into the furnace by means of the pusher 17.

The upstream ring 39 of the shear 11 is preferably a two-part ring, having an horizontal parting plane. Prior to shearing of a log, these parts of the ring are moved vertically towards each other to grip the log immediately downstream of the shear line.

I claim:

1. A method of dividing first and second logs of heated metal into billets comprising the steps of:
   dividing said first log into a plurality of billets with a remainder of said first log being left over after said dividing is completed;
   dividing said remainder into a plurality of parts;

dividing said second log into a plurality of parts; and combining each of said parts from said remainder with one of said parts from said second log to form a plurality of billet pairs, each part from said remainder being used as a first billet in each of said billet pairs.

2. A method of dividing first and second logs of heated metal into billets comprising the steps of:

advancing said first and second logs along a path through a furnace toward a shear, said shear being directly ahead of said furnace;

dividing said first log into a plurality of billets using said shear with a remainder of said first log being left over after said dividing is completed;

advancing said remainder of said first log into said shear;

dividing said remainder of said first log into a leading portion and a trailing portion using said shear;

moving said leading portion to a position ahead of said shear;

moving said trailing portion rearwardly from said shear along said path to a position between said shear and said furnace;

moving said trailing portion transversely out of said path;

advancing said second log along said path through said shear;

dividing said second log using said shear in order to form a leading portion and a remaining portion;

transferring said leading portion of said second log together with said leading portion of said first log to a work station for further processing;

moving said trailing portion of said first log back into said path;

advancing said trailing portion of said first log together with said remaining portion of said second log through said shear;

removing a further portion from said remaining portion of said second log; and transferring said further portion of said second log together with said trailing portion of said first log to said work station for further processing.

3. The method of claim 2 further comprising the steps of:

comparing the length of the remainder of said first log after said dividing of each billet therefrom with the length of the next billet to be produced in order to determine whether said length of said next billet exceeds said length of said remainder by a selected distance; and dividing said remainder of said first log into said leading portion and said trailing portion if said length of said next billet exceeds said length of said remainder by said selected distance, said leading portion having a length substantially less than said length of said next billet.

4. The method of claim 2 further comprising the steps of:

comparing the length of the remainder of said first log after said dividing of each billet therefrom with the length of the next billet to produced in order to determine whether said length of said next billet is less than said length of said remainder by a selected distance; and dividing said remainder of said first log into said leading portion and said trailing portion if said length of said next billet is less than said length of said remainder by said selected distance, said leading portion having a length substantially less than said length of said next billet.

5. The method of claim 2 further comprising the steps of:

returning to said furnace said trailing portion of said first log after said moving of said trailing portion back into said path;

advancing said trailing portion from said furnace to said shear together with said remaining portion of said second log.

6. The method of claim 2 further comprising the step of measuring the length of said first log and said second log when said logs are introduced into said path.

7. Apparatus for heating and shearing into billets metal logs, the apparatus comprising a furnace, a shear spaced from the furnace, guide means defining a rectilinear path through the furnace and through the shear, respective pushers at opposite ends of said path for pushing logs along said path in either selected direction and holding means for moving transversely from a position on said path between the furnace and the shear a trailing end portion of a log, holding that trailing end portion out of said path and then returning the trailing end portion to the path between the furnace and the shear.

8. Apparatus according to claim 7 further comprising control means for controlling operation of the shear, of the pushers and of the holding means, signalling means for providing to the control means a signal representing movement of the pusher at the upstream end of said path and sensing means for sensing the presence of a log at a predetermined position along the path.

* * * * *